United States Patent
Ko et al.

(10) Patent No.: US 8,741,055 B2
(45) Date of Patent: Jun. 3, 2014

(54) METHOD FOR PRODUCTION OF HYDRAULIC BINDER

(75) Inventors: Suz-chung Ko, Lenzburg (CH); Peter Kruspan, Pratteln (CH); Juraj Gebauer, Veltheim (CH)

(73) Assignee: Holcim Technology Ltd., Jona (CH)

( * ) Notice: Subject to any disclaimer, the term of this patent is extended or adjusted under 35 U.S.C. 154(b) by 218 days.

(21) Appl. No.: 13/313,794

(22) Filed: Dec. 7, 2011

(65) Prior Publication Data

US 2012/0132111 A1 May 31, 2012

Related U.S. Application Data

(63) Continuation-in-part of application No. 11/547,594, filed as application No. PCT/IB2005/000878 on Apr. 5, 2005, now abandoned.

(30) Foreign Application Priority Data

Apr. 5, 2004 (AT) .................. A 598/2004

(51) Int. Cl.
| | | |
|---|---|---|
| C04B 18/08 | (2006.01) | |
| C04B 7/19 | (2006.01) | |
| C04B 7/153 | (2006.01) | |
| C04B 28/08 | (2006.01) | |
| C04B 40/00 | (2006.01) | |
| C04B 14/04 | (2006.01) | |
| C04B 14/06 | (2006.01) | |
| C04B 111/10 | (2006.01) | |
| C04B 103/12 | (2006.01) | |
| C04B 103/30 | (2006.01) | |
| C04B 103/32 | (2006.01) | |

(52) U.S. Cl.
CPC ....... *C04B 7/1535* (2013.01); *C04B 2111/1018* (2013.01); *C04B 28/08* (2013.01); *C04B 40/0082* (2013.01); *C04B 2103/12* (2013.01); *C04B 2103/30* (2013.01); *C04B 2103/32* (2013.01); *C04B 14/04* (2013.01); *C04B 14/047* (2013.01); *C04B 14/06* (2013.01)
USPC .......................................... 106/714; 106/789

(58) Field of Classification Search
CPC ..................... C04B 7/1535; C04B 2111/1018; C04B 28/08; C04B 14/04; C04B 14/06; C04B 14/047; C04B 40/0082; C04B 2103/12; C04B 2103/30; C04B 2103/32
USPC .................................................. 106/714, 789
See application file for complete search history.

(56) References Cited

U.S. PATENT DOCUMENTS

| | | | |
|---|---|---|---|
| 4,472,201 A | 9/1984 | Ochi et al. | |
| 6,572,698 B1 | 6/2003 | Ko | |
| 8,460,459 B2 * | 6/2013 | Ellenrieder et al. | .......... 106/790 |
| 2003/0167972 A1 | 9/2003 | Ko | |
| 2005/0241543 A1* | 11/2005 | Hagen et al. | .................. 106/805 |

FOREIGN PATENT DOCUMENTS

WO    WO 00/00447 A1    1/2000

OTHER PUBLICATIONS

Machine translation of Bellmann (DE102009024200).*

* cited by examiner

*Primary Examiner* — Jun Li
(74) *Attorney, Agent, or Firm* — Taft Stettinius & Hollister LLP

(57) ABSTRACT

A method for the production of an alkali activated hydraulic binder, with the binder comprising slag, natural aluminum silicates, and an alkali activator, and the binder being free of $CaSO_4$. The slag is provided in amounts greater than or equal to 20% (w/w), and the natural aluminum silicates are different from furnace slag, and are provided in amounts from 5 to 75% (w/w). The alkali activator is provided in an amount which corresponds to a $Na_2O$ equivalent defined as ($Na_2O+0.658$ $K_2O$) (ASTM C 150) between 0.7 and 4% (w/w). The method includes the step of heat treating a mixture of the slag, the natural aluminium silicates, and the alkali activator at temperatures between 40° C. and 50° C. for 4 to 6 hours.

20 Claims, 1 Drawing Sheet

METHOD FOR PRODUCTION OF HYDRAULIC BINDER

Figure 1:
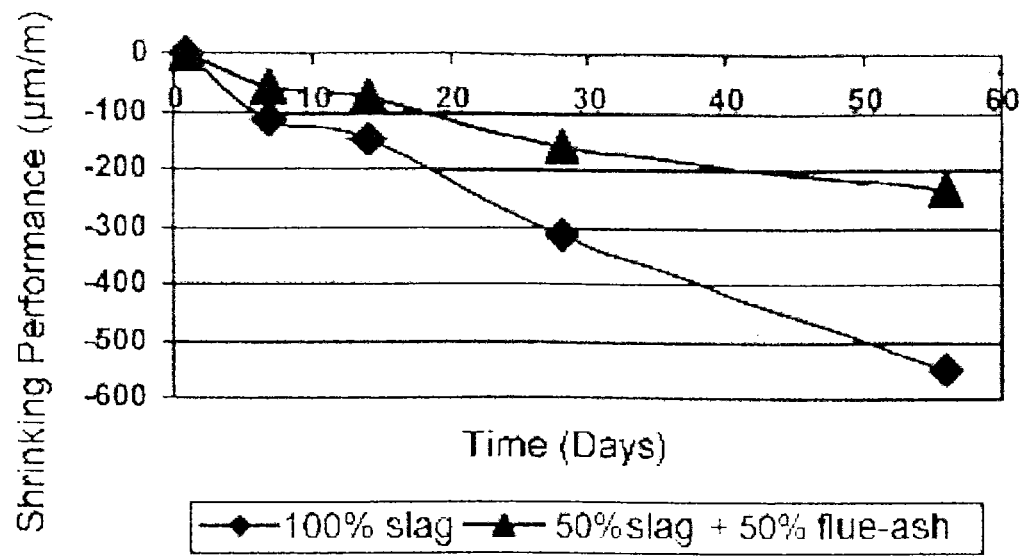

This application is a continuation-in-part of application Ser. No. 11/547,594 filed Oct. 4, 2006, the contents of which are incorporated by reference herein in their entirety. Application Ser. No. 11/547,594 was the U.S. National Stage of PCT/IB2005/000878 filed Apr. 5, 2004, the contents of which are incorporated by reference herein in their entirety. The invention relates to an alkali-activated hydraulic binder containing slags and aluminium-silicates.

The composition and production of super sulphated metallurgical cements is based on the addition of calcium-sulphate to the cement. According to the international organisation for standardisation (ISO) super sulphated cement is defined as a blend of at least 75% (w/w) hackled, granulated furnace slag, large additives of calcium-sulphate (>5% (w/w) $SO_3$) and at most 5% (w/w) slacked lime, portland-cement clinker or portland-cement.

For the production of super sulphated cement the granulated slag according to the German norm has to contain at least 13% (w/w) $Al_2O_3$ and has to correspond to the formula $(CaO+MgO+Al_2O_3)/SiO_2>1.6$. According to Keil an amount of 15 to 20% alumina slag with a minimal modulus of $(CaO+CaS+0.5MgO+Al_2O_3)/(SiO_2+MnO)>1.8$ is preferred. According to Blondiau the $CaO/SiO_2$ ratio has to be between 1.45 and 1.54 and the $Al_2O_3/SiO_2$ ratio has to be between 1.8 and 1.9.

Lime, clinker or cement are added in order to increase the pH-value in the cement-paste and to enhance the solubility of alumina soil in the liquid phase during the hydration of the cement. The hardening of super sulphated metallurgical cement can take place without chemical additives or a specific formation treatment.

U.S. Pat. No. 5,626,665 discloses a mixed puzzolana for use with portland-cement for the production of a cement like system. The mixed puzzolana contains burned clay and at least one component chosen from the group consisting of at about 2% to at about 30% gypsum, at about 0% to at about 25% hydrated kiln dust, at about 0% to at about 20% hydrated lime, at about 0% to at about 20% hydrated lime kiln dust, at about 0% to at about 50% flue-ash and at about 0% to at about 5% organic plastificator. The burned lime is present in sufficient amounts in order to yield a mixed puzzolana with a final total weight of 100%. The mixed puzzolana is mixed with portland-cement in a weight-ratio of at about 1:20 to at about 1:1, preferably at about 1:2 to at about 1:3.

In normal Portland-cements and metallurgical cements, in which the hydration takes place in the liquid phase free of solubilized alumina, the content of calcium-sulphate ($CaSO_4$) is restricted to a minor percentage in order to avoid a potential inner decay due to the formation of calcium-sulfo-aluminate (candlot bacilli) as a consequence of the non-solubilized alumina. In these cements the main influence of calcium-sulphate consists in the retarding action, which it exerts on the setting time. The basicity of the hydrated calcium aluminates as well as the insolubility of the alumina contained in the aluminates depends on the lime concentration in the liquid phase of the cement and this independently from whether the hydrated calcium aluminates in the hardened cement are present in the crystalline form or in the amorphous form. The lime concentration in the liquid phase determines the kind of influence of the calcium-sulphate on the setting time of the cement and the maximal calcium-sulphate amount, which the cement can contain without resulting into inner decay to retarded formation of ettringite.

In super sulphated metallurgical cements the lime concentration in the liquid phase is below the limit of insolubility of the alumina. Larger additions of calcium-sulphate for the activation of reactions of furnace slag determine the formation of tricalcium-sulfo-aluminate with higher hydraulic activity on the basis of the solubilized lime and the solubilized alumina without resulting in potential decay. The addition of calcium-sulphate to granulated furnace slag does not create expansion-cement but acts as accelerating agent in the formation of hydrated compounds. In super sulphated cement, larger portions of calcium-sulphate are not to be considered as troublesome. The tricalcium-sulfo-aluminate, in which they result, in fact rather contribute to an increase of the hydraulic activity instead of causing decay, as it is the case for portland-cement and normal metallurgical cement.

The initial setting and hardening of super sulphated cement goes along with the formation of the high sulphate form of calcium-sulfo-aluminate from the slag components and the added calcium-sulphate. The addition of portland-cement to cement is required for the adjustment of the adequate alkalinity in order to allow for the formation of ettringite. The most important products of hydratisation are the mono- and trisulfo-aluminate-tobermorite-like phase and alumina.

Super sulphated cement in the course of the hydratisation binds to more water than portland-cement. It fulfils all requirements of the norm of cement as to the grinding fineness. It is considered as cement with low calorific value. As any portland- or metallurgical cement it can be used in form of concrete, setting mortar or groove mortar. The conditions to be considered for the use of super sulphated cement are identical with those that are decisive for the mixing and the application of other cements.

For the improvement of alumino silicate-binders it has already been suggested to activate them with alkali and in particular soda-brine or potassium hydroxide brine.

Alkali activated alumino silicate-binders (AAAS) are cement-like materials which are formed by reaction of fine silica- and alumina solids with an alkali- or alkali-salt solution for the production of gels and crystalline compounds. The technology of alkali activation was originally developed by Purdon from 1930 to 1940, who discovered that the addition of alkali to slag yields a rapidly hardening binder.

In contrary to super sulphated cement, a large variety of materials (natural or burned lime, slag, flue-ash, belite alluvia, milled stone etc.) can be used as a source for alumino silicate-materials. Different alkali solutions can be used for the production of hardening reactions (alkali hydroxide, silicate, sulphate and carbonate etc.). That means that the sources for AAAS-binders are practically unlimited.

During the alkali activation, a high concentration of OH-ions acts on the mixture of the alumino silicates. While in portland- or super sulphated cement-paste a pH>12 is generated due to the solubility of calcium hydroxide, the pH-value in the AAAS-system is beyond 13.5. The amount of alkali, which is in general between 2 to 25% (w/w) alkali (>3% $Na_2O$), depends on the alkalinity of the alumino silicates.

The reactivity of an AAAS-binder depends on its chemical and mineral composition, the degree of vitrification and the grinding fineness. In general, AAAS-binders can begin to set within 15 min. and on the long run offer a quick hardening and a considerable increase in strength. The setting reaction and the process of hardening are still not completely understood. They go along with the initial leaching of alkali and the formation of slight crystalline calcium hydrosilicates of the tobermorite-group. Calcium-alumino silicates begin to crystallise to form zeolite-like products and consequently alkali-zeolite.

The strength values in the AAAS-system are contributed to the intense crystallisation contact between zeolites and calcium hydrosilicates. The hydraulic activity is improved by an increase of the alkali doses. The relation between the hydraulic activity and the amount of alkali as well as the presence of zeolite in the hydrated product has revealed that alkali not only act as simple catalysts but also participate in reactions in the same way as lime and gypsum and feature a relatively high strength due to a considerable influence of cations.

In numerous studies concerning the activity of silico aluminate materials with alkali and their salts have been reported.

From WO 00/00448 an activated alumino-silicate-binder has already become known in which for the reduction of high portions of soda brine or potassium brine and for the improvement of the strength values cement kiln dust was applied as the activator. Cement kiln dust hereby was suggested in amounts from 1 to 20% (w/w). The addition of cement kiln dust increases the water demand and hence increases the risk of shrinking cracks.

The invention aims to create an alkali activated hydraulic binder of the initially mentioned kind which features minor lime portions and improved strength-values at an early stage and a reduced water/cement factor, whereby a higher resistance and a reduced susceptibility to the formation of cracks is safeguarded.

To solve this object the method for the production of an alkali activated hydraulic binder, the binder comprising slag, natural aluminum silicates, and an alkali activator, and said binder being free of $CaSO_4$ generally consists in that the slag is provided in amounts greater than or equal to 20% (w/w); the natural aluminum silicates, preferably flue-ash free of $CaSO_4$, basalt, clays, marl, andesite or zeolite, are different from furnace slag, and are provided in amounts from 5 to 75% (w/w); and the alkali activator is provided in an amount which corresponds to a $Na_2O$ equivalent defined as $(Na_2O+0.658 K_2O)$ (ASTM C 150) between 0.7 and 4% (w/w), and comprises the step of heat treating a mixture of said slag, said aluminium silicates, and said alkali activator at temperatures between 40° C. and 50° C. for 4 to 6 hours.

Surprisingly it has turned out that, when using the alkali activator in the specified amounts, the portion of furnace slag can be lowered to 20% (w/w) and still adequate strength values at an early stage can be achieved. Such a lowering of a portion of furnace slag particularly is effected with the preferred alumino silicates as for example flue-ash and natural aluminium silicates like basalt, whereby with the binder according to the invention at the same time the advantage is achieved that the portion of CaO in the mixture can be considerable lowered. The lowering of the CaO content brings about that the $CO_2$ formation during production of such a binder is considerably reduced and that hence the production becomes more ecologically friendly. The substitute of furnace slag by aluminium silicates simultaneously brings about that the shrinking performance in the beginning of the hardening process is importantly improved whereby the water demand is reduced and the alkali-aggregate reactivity is reduced. All these properties lead to a particularly durable and fatigue endurable product. While normally the addition of portland-cement clinker improves the strength values at an early stage, such an additive can be abandoned if the method according to the invention comprises a heat treatment. According to the invention, a binder with high strength at an early stage is hereby provided by heat treating the mixture at temperatures between 40° C. and 50° C. for 4 to 6 hours. Surprisingly such a heat treatment brings about that also with complete abandonment of portland-cement clinker comparable strength values at an early stage can be achieved already after one day. As the activator, sodium silicate can be applied in a particularly advantageous manner. The invention is directed to hydraulic binders not containing any $CaSO_4$ but are solely alkali activated. Also the flue-ash to be used in the present invention is meant to be free of $CaSO_4$. A hydration by $CaSO_4$ would ask for much lower amounts of alkali to keep the alkalinity of the hydration system clearly under pH 13. The presence of $CaSO_4$ at the high alkali-contents envisaged by the present invention would lead to the formation of unstable ettringite, which would be detrimental for the strength of the concrete.

In a particularly preferred manner according to the invention alkali hydroxides, -silicates, -carbonates and/or sulphates of Na and/or K are applied as alkali activator. Advantageously, the mixture can herein additionally be supplied with limestone and/or quartzes with the requirement that the $Al_2O_3$-content of the mixture is greater than or equal to 5% (w/w).

The shrinking performance and hence the increased resistance can in particular be improved thereby, that for the reduction of the water/cement ratio, plastification agents- and/or superliquefiers in amounts from 0.1 to 1% (w/w) related to the dry substance are added whereby preferably as setting accelerator portland-cement clinker is additionally used in amounts between 0.1 and 5% (w/w) in order to safeguard adequately high strength values at an early stage.

In the following the invention will be explained in more detail by means of exemplary embodiments.

In Table 1, three examples of possible compositions of the binder according to the invention and the resulting strength values at an early stage are listed.

TABLE 1

| Example | | 1 | 2 | 3 |
|---|---|---|---|---|
| Furnace slag | % | 69 | 46 | 23 |
| Flue-ash (free of $CaSO_4$) | % | 23 | 46 | 69 |
| $Na_2SiO_3 \cdot 5H_2O$ | % | 6 | 6 | 6 |
| KOH | % | 2 | 2 | 2 |
| Water/cement factor | | 0.34 | 0.32 | 0.31 |
| CS 1 day | MPa | 22.1 | 21.4 | 12.3 |
| CS 2 days | MPa | 28.5 | 28.1 | 20.0 |
| CS 28 days | MPa | 55.9 | 54.2 | 37.2 |

Table 2 presents three additional exemplary embodiments from which the improvement of the strength at an early stage by the addition of Portland-cement clinker or by the heat treatment can be seen.

TABLE 2

| Example | | 1 | 2 | 3 |
|---|---|---|---|---|
| Furnace slag | | 45.5 | 43.0 | 45.5 |
| Basalt | % | 45.5 | 43.0 | 45.5 |
| $Na_2SiO_3 \cdot 5H_2O$ | % | 9 | 9 | 9 |
| Portland-cement clinker | % | — | 5 | — |
| Temperature treatment | % | normal | normal | 40° C. (6 h) |
| Water/cement factor | | 0.33 | 0.32 | 0.35 |
| CS 1 day | MPa | 1.3 | 21.6 | 20.3 |
| CS 2 days | MPa | 23.9 | 30.6 | 23.8 |
| CS 28 days | MPa | 51.9 | 53.4 | 44.1 |

In FIG. 1, the improvement of the shrinking performance over time by at least partial replacement of the furnace slag by flue-ash can be seen.

Figure 2:
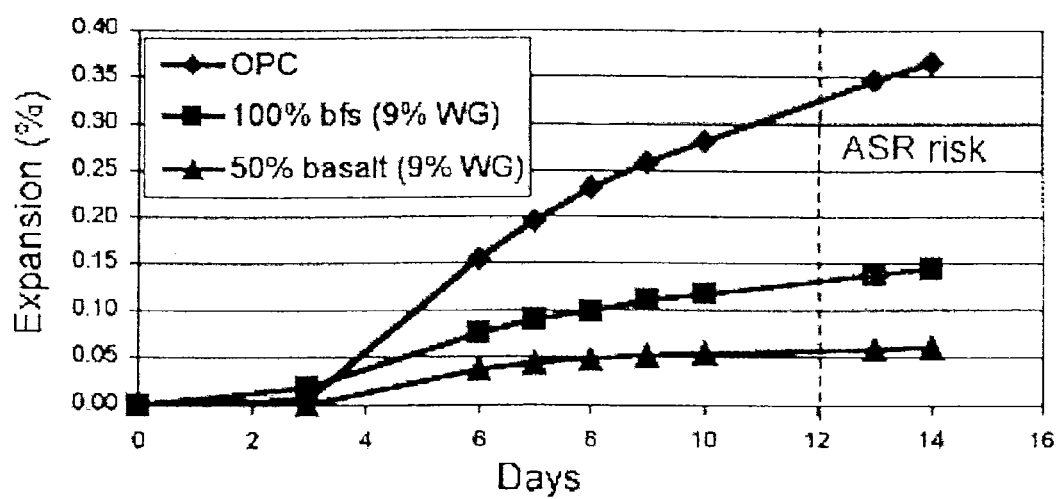

FIG. 2 shows the increasing suppression of the alkali-silica-reactivity caused by the replacement of furnace slag by basalt, whereby OPC means portland-cement clinker and BFS means furnace slag. ASR demarks the alkali-silica-reactivity.

The invention claimed is:
1. Method for the production of an alkali activated hydraulic binder,
the binder comprising slag, natural aluminum silicates, and an alkali activator, and said binder being free of $CaSO_4$, wherein
the slag is provided in amounts greater than or equal to 20% (w/w);
the natural aluminum silicates are different from furnace slag, and are provided in amounts from 5 to 75% (w/w); and
the alkali activator is provided in an amount which corresponds to a $Na_2O$ equivalent defined as ($Na_2O+0.658$ $K_2O$) (ASTM C 150) between 0.7 and 4% (w/w),
comprising the step of heat treating a mixture of said slag, said natural aluminium silicates, and said alkali activator at temperatures between 40° C. and 50° C. for 4 to 6 hours.

2. Method for the production of an alkali activated hydraulic binder,
the binder comprising slag, natural aluminum silicates, and an alkali activator, and said binder being free of $CaSO_4$, wherein
the slag is provided in amounts greater than or equal to 20% (w/w);
the natural aluminum silicates are different from furnace slag, and are provided in amounts from 5 to 75% (w/w); and
the alkali activator is provided in an amount which corresponds to a $Na_2O$ equivalent defined as ($Na_2O+0.658$ $K_2O$) (ASTM C 150) between 0.7 and 4% (w/w),
comprising the step of heat treating a mixture of said slag, said natural aluminium silicates, and said alkali activator at temperatures between 40° C. and 50° C. for 3 hours.

3. Method for the production of an alkali activated hydraulic binder according to claim 1, wherein the alkali activator is one or more selected from the group consisting of alkali hydroxide, alkali-silicate, alkali-carbonate, sulphates of Na, and sulphates of K.

4. Method for the production of an alkali activated hydraulic binder according to claim 1, wherein the binder further comprises one or more selected from the group consisting of limestone and quartzes, and wherein an $Al_2O_3$-content of the binder is greater than or equal to 5% (w/w).

5. Method for the production of an alkali activated hydraulic binder according to claim 1, further comprising the step of providing, for the reduction of a water/cement ratio, one or more selected from the group consisting of plastification agent and superliquefiers, in amounts from 0.1 to 1% (w/w) relative to the dry substance in the binder.

6. Method for the production of an alkali activated hydraulic binder according to claim 1, wherein the binder further comprises Portland-cement clinker provided in amounts between 0.1 and 5% (w/w) as a setting accelerator.

7. Method for the production of an alkali activated hydraulic binder according to claim 1, wherein the slag is furnace slag.

8. Method for the production of an alkali activated hydraulic binder according to claim 1, wherein the natural aluminium silicates are one or more selected from the group consisting of flue-ash free of $CaSO_4$, basalt, clays, marl, andesite and zeolite.

9. Method for the production of an alkali activated hydraulic binder according to claim 2, wherein the alkali activator is one or more selected from the group consisting of alkali hydroxide, alkali-silicate, alkali-carbonate, sulphates of Na, and sulphates of K.

10. Method for the production of an alkali activated hydraulic binder according to claim 2, wherein the binder further comprises one or more selected from the group consisting of limestone and quartzes, and wherein an $Al_2O_3$-content of the binder is greater than or equal to 5% (w/w).

11. Method for the production of an alkali activated hydraulic binder according to claim 3, wherein the binder further comprises one or more selected from the group consisting of limestone and quartzes, and wherein an $Al_2O_3$-content of the binder is greater than or equal to 5% (w/w).

12. Method for the production of an alkali activated hydraulic binder according to claim 2, further comprising the step of providing, for the reduction of a water/cement ratio, one or more selected from the group consisting of plastification agent and superliquefiers, in amounts from 0.1 to 1% (w/w) relative to the dry substance in the binder.

13. Method for the production of an alkali activated hydraulic binder according to claim 3, further comprising the step of providing, for the reduction of a water/cement ratio, one or more selected from the group consisting of plastification agent and superliquefiers, in amounts from 0.1 to 1% (w/w) relative to the dry substance in the binder.

14. Method for the production of an alkali activated hydraulic binder according to claim 4, further comprising the step of providing, for the reduction of a water/cement ratio, one or more selected from the group consisting of plastification agent and superliquefiers, in amounts from 0.1 to 1% (w/w) relative to the dry substance in the binder.

15. Method for the production of an alkali activated hydraulic binder according to claim 2, wherein the binder further comprises Portland-cement clinker provided in amounts between 0.1 and 5% (w/w) as a setting accelerator.

16. Method for the production of an alkali activated hydraulic binder according to claim 3, wherein the binder further comprises Portland-cement clinker provided in amounts between 0.1 and 5% (w/w) as a setting accelerator.

17. Method for the production of an alkali activated hydraulic binder according to claim 4, wherein the binder further comprises Portland-cement clinker provided in amounts between 0.1 and 5% (w/w) as a setting accelerator.

18. Method for the production of an alkali activated hydraulic binder according to claim 5, wherein the binder further comprises Portland-cement clinker provided in amounts between 0.1 and 5% (w/w) as a setting accelerator.

19. Method for the production of an alkali activated hydraulic binder according to claim 2, wherein the slag is furnace slag.

20. Method for the production of an alkali activated hydraulic binder,
the binder comprising furnace slag, natural aluminum silicates, and an alkali activator, and said binder being free of $CaSO_4$, wherein
the furnace slag is provided in amounts greater than or equal to 20% (w/w);
the natural aluminum silicates are different from furnace slag, and are provided in amounts from 5 to 75% (w/w); and
the alkali activator is provided in an amount which corresponds to a $Na_2O$ equivalent defined as ($Na_2O+0.658$ $K_2O$) (ASTM C 150) between 0.7 and 4% (w/w),
comprising the steps of: heat treating a mixture of said furnace slag, said natural aluminium silicates, and said alkali activator at temperatures between 40° C. and 50° C. for 4 to 6 hours; and providing, for the reduction of a water/cement ratio, one or more selected from the group consisting of plastification agent and superliquefiers, in amounts from 0.1 to 1% (w/w) relative to the dry substance in the binder, wherein
the alkali activator is one or more selected from the group consisting of alkali hydroxide, alkali-silicate, alkali-carbonate, sulphates of Na, and sulphates of K,
the binder further comprises one or more selected from the group consisting of limestone and quartzes,
an $Al_2O_3$-content of the binder is greater than or equal to 5% (w/w),
the binder further comprises Portland-cement clinker provided in amounts between 0.1 and 5% (w/w) as a setting accelerator, and
the natural aluminium silicates are one or more selected from the group consisting of flue-ash free of $CaSO_4$, basalt, clays, marl, andesite and zeolite.

* * * * *